（12) United States Patent
Choisnet

(10) Patent No.: US 6,698,281 B1
(45) Date of Patent: Mar. 2, 2004

(54) VANE DESIGNED TO GET ORIENTED IN THE AMBIENT AIR FLOW AXIS

(75) Inventor: Joël Choisnet, Naveil (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/926,231

(22) PCT Filed: Mar. 31, 2000

(86) PCT No.: PCT/FR00/00825

§ 371 (c)(1),
(2), (4) Date: Sep. 27, 2001

(87) PCT Pub. No.: WO00/60363

PCT Pub. Date: Oct. 12, 2000

(30) Foreign Application Priority Data

Apr. 2, 1999 (FR) .............................. 99 04183

(51) Int. Cl.⁷ .............................. A63B 53/00
(52) U.S. Cl. ............... 73/170.02; 73/170.01; 73/170.03
(58) Field of Search ............ 73/180, 147, 170.03, 73/170.02, 148, 861.74

(56) References Cited

U.S. PATENT DOCUMENTS

| 4,797,603 A |   | 1/1989 | Choisnet |
| 4,972,725 A |   | 11/1990 | Choisnet |
| 5,010,775 A |   | 4/1991 | Choisnet |
| 5,406,839 A | * | 4/1995 | Leblond et al. ............... 73/180 |
| 6,091,335 A |   | 7/2000 | Breda et al. |
| 6,378,361 B1 | * | 4/2002 | Larsen et al. ................. 73/147 |

FOREIGN PATENT DOCUMENTS

| FR | 2 1005 080 | 4/1972 |
| FR | 2 665 539 | 2/1992 |
| WO | WO 93/03326 | 2/1993 |

* cited by examiner

*Primary Examiner*—Hezron Williams
*Assistant Examiner*—Alandra Ellington
(74) *Attorney, Agent, or Firm*—Oblon, Spivak, McClelland, Maier & Neustadt, P.C.

(57) ABSTRACT

A vane designed to get oriented in the axis of an ambient airflow. The vane allows for the intake of differential pressure presenting the aerodynamic incidence α of the vane. According to the invention, the differential pressure intake is balanced when the vane is oriented naturally in the axis of the airflow.

7 Claims, 2 Drawing Sheets

VANE DESIGNED TO GET ORIENTED IN THE AMBIENT AIR FLOW AXIS

BACKGROUND OF THE INVENTION

1. Field of the Invention

The invention pertains to a vane designed to get oriented in the axis of an ambient airflow.

Such a vane is advantageously used in an aircraft probe designed to measure aerodynamic parameters of the ambient airflow of the aircraft.

2. Discussion of the Background

The piloting of any aircraft implies knowledge of the relative speed of the aircraft with respect to the ambient air, namely the relative wind. This speed is determined by means of sensors of static pressure po, the total pressure pt and the angle of incidence α. The angle α gives the direction of the speed vector in a reference system related to the aircraft and pt–po gives the modulus of this speed vector. The three aerodynamic parameters are therefore used to determine the speed vector of an aircraft and subsidiarily a convertible or tilt-rotor aircraft.

One vane described in French patent FR 2 665 539 shows the utility of making the probe get oriented in the axis of the ambient airflow in order to facilitate the measurement of the angle of incidence. To overcome the frictional forces in the axis of rotation of the vane, that patent describes the use of a mechanical control loop system to cancel the aerodynamic incidence of the vane. That control loop system is useful above all at the low speeds of ambient air flow because, the lower the speed, the weaker are the aerodynamic forces of air on the vane, which do not suffice to overcome the mechanical frictional forces to orient the vane accurately in the axis of the ambient airflow. The use of the control loop system based on the cancelling of the aerodynamic incidence of the vane, however, has one drawback. In practice, the inevitable imperfections in the making of the vane create an angular divergence between the orientation of the vane due to the aerodynamic forces at high airflow speeds and the orientation of the vane due to the control loop at the low airflow speeds. Furthermore, at high airflow speeds, the control loop system may attempt to modify the orientation of the vane without being able to do so because of the size of the aerodynamic forces. This results in unnecessary consumption of electrical power by the control loop system.

SUMMARY OF THE INVENTION

The invention is aimed at overcoming these drawbacks by proposing a device that improves the consistency of the orientation of the vane whatever the speed of the ambient airflow.

To achieve this goal, an object of the invention is a vane device designed to get oriented in the axis of an ambient airflow and provided with means for the intake of differential pressure representing the aerodynamic incidence of the vane, characterized in that the intake of differential pressure is balanced when the vane is oriented naturally in the axis of the flow.

One advantage related to the invention is that it limits the cost of making the vane by preventing the narrowing of the tolerance values of shape, position, and dimension in the definition of the profile of the vane.

Another advantage related to the invention is that it prevents the introduction of corrections into the control loop parameters. Such corrections would hamper the interchangeability of the mobile blade of the vane alone, without its control loop means.

BRIEF DESCRIPTION OF THE DRAWINGS

The invention will be understood more clearly and other advantages shall appear from the following detailed description of an embodiment illustrated by the appended drawings, of which.

DESCRIPTION OF THE PREFERRED EMBODIMENTS

Figure 1:
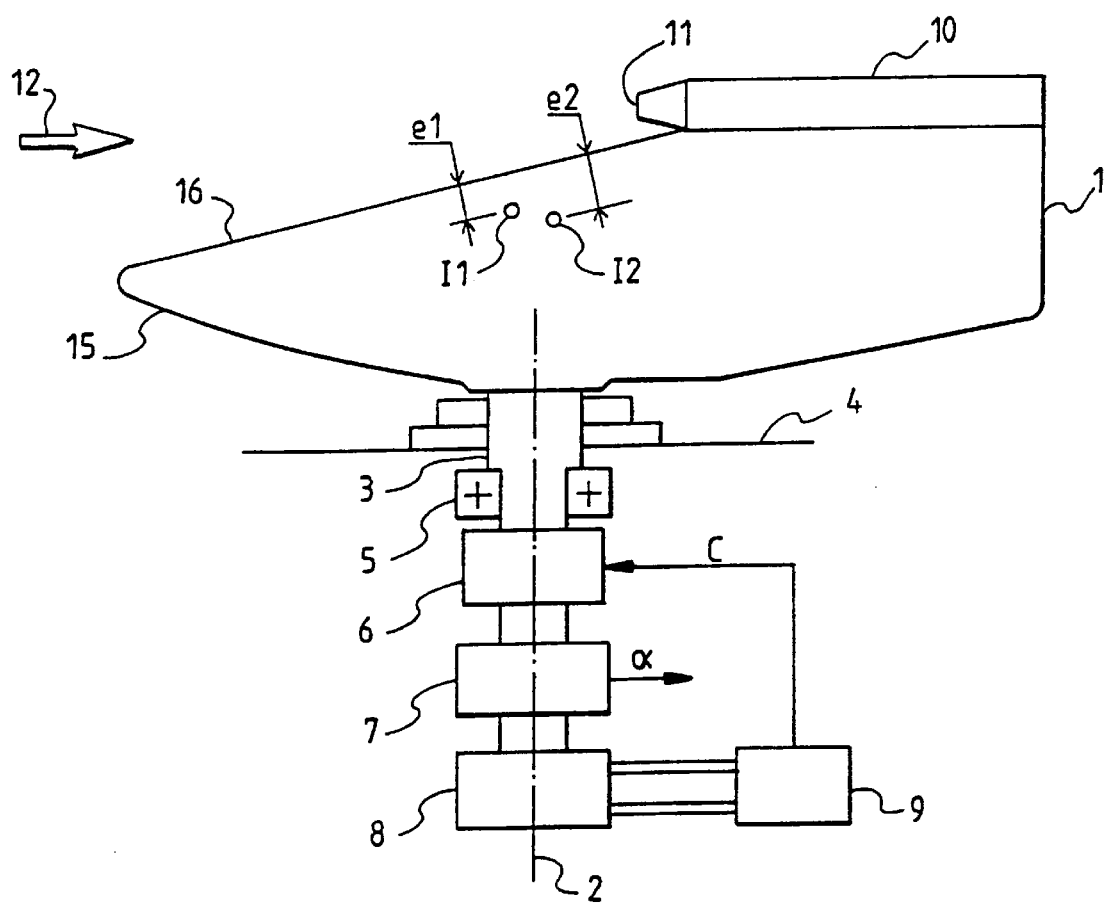
FIG. 1 shows a vane according to the invention.

The vane 1 shown in FIG. 1 is rotationally mobile about an axis 2. It has for example a shaft 3 with an axis 2 that penetrates the skin 4 of an aircraft. The shaft 3 is rotationally mobile with respect to the aircraft, for example by means of a roller bearing 5. The shaft 3 is rotationally driven by means of a motor 6 designed to orient the vane 1 in a precise angular position about the axis 2. The shaft 3 is fixedly joined to means 7 for measuring this angular position. These means 7 comprise, for example, an optical encoder. The angular position of the vane 1, available at output of the means 7, defines the angle of incidence a of the aircraft. The shaft 3 is also fixedly joined to a pneumatic seal 8 used to transmit the pneumatic information, picked up by the vane 1, to the processing means 9.

The vane 1 may comprise means for the intake of the total pressure comprising a tube 10 open at one of its ends 11. The tube 10 is substantially oriented in the axis of ambient airflow 12 when the vane is oriented in this axis of airflow 12.

The vane 1 may also comprise means for the intake of the static pressure po located on the side of the tube 10. These means are not shown in FIG. 1.

The vane 1 has a blade 15, for example with the shape of a delta half-wing. The blade 15 is symmetrical with respect to the plane of FIG. 1. The blade has a leading edge 16. On its lower and upper faces, in the vicinity of the leading edge 16, the blade 15 has differential pressure intake means. On at least one face of the blade 15, for example the lower face, these means have two holes I1 and I2 respectively located at a distance e1 and e2 from the leading edge 16. The holes I1 and I2 both communicate with a chamber 20 which is better defined in FIG. 2.

Figure 2:
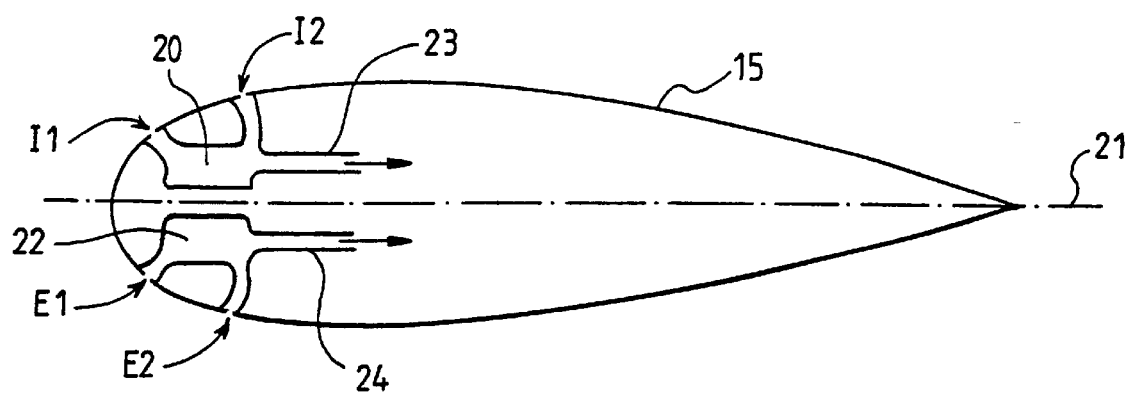
FIG. 2 shows the interior of a blade of the vane.

FIG. 2 shows the blade 15 in a sectional view along the plane perpendicular to the plane of FIG. 1 and to the leading edge 16. The profile of the blade 15 shown in FIG. 2 is symmetrical with respect to a plane 21 perpendicular to FIG. 2.

The profile is for example that of an aircraft wing. On the lower surface, the two holes 11 and 12 communicate with the chamber 20 located inside the blade 15. On the upper face, two holes E1 and E2 communicate with a chamber 22 also located inside the blade 15. The chamber 20 communicates by means of a tubular hole 23 with a pneumatic seal 8 shown in FIG. 1. Similarly, the chamber 22 communicates by means of a tubular hole 24 with the pneumatic seal 8.

The pneumatic seal delivers the pressure of the chamber 20 and that of the chamber 22 to processing means 9. The processing means 9 compare these pressure values and generate a control signal c for the motor 6 so as to orient the blade 15 in such a way that the pressure in the chamber 20 is equal to the pressure in the chamber 22. The processing means 9 may have a flowmeter detecting a divergence from a zero flowrate between the two chambers 20 and 22.

To give the vane 1 the right orientation, whatever the speed of flow 12, and to mitigate the defects of symmetry of position of the holes E1, I1 on the one hand and E2, I2 on the other hand and also to make up for the differences in dimensions between these holes, it is planned to balance the differential pressure between each chamber 20 and 22 by matching the dimensions of at least one of the holes when the vane 1 is naturally oriented in the axis of the flow 12.

It is noted for example that, when the holes I1 and I2 have the same dimensions, the pressure PI within the chamber 20 is equal to:

$$PI = \frac{PI1 + PI2}{2}.$$

PI1 is the air pressure at the hole I1, and PI2 is the air pressure at the hole I2.

The pressure PI1 is greater than the pressure PI2. This difference in pressure is due to the difference between the distances e1 and e2. The closer the hole, in this case I1, to the leading edge 16, the greater is the to pressure PI1 therein.

Consequently, when the vane 1 is naturally oriented in the axis of the flow 12 and if a difference in pressure is observed between the chambers 20 and 22, it is possible in order to balance the pressures in the two chambers 20 and 22, for example to increase the pressure PI present in the 15 chamber 20 by increasing a dimension, for example the diameter, of the hole I1. It is equally well possible to reduce the pressure PI present in the chamber 20 by increasing a dimension of the hole I2. Similarly, it is possible to modify the pressure PE prevailing in the chamber 22 by modifying a dimension of one of the holes E1 or E2.

In practice, the vane 1 can be placed in a wind tunnel with a high-speed airflow 12 so that the blade 15 gets naturally oriented in the axis of airflow without any control by the processing means 9 over the motor 6. If a difference in pressure is observed between the chambers 20 and 22, one dimension of one of the holes, for example I1 or I2, is modified so as to modify the pressure of one of the chambers so as to substantially cancel out the difference in pressure between the two chambers 20 and 22.

To implement the invention, it is enough that at least one of the chambers 20 and 22 should have means to modify the pressure prevailing therein, and the other chamber may comprise only one orifice. However, for reasons of symmetry, it is preferable that both chambers 20 and 22 should both comprise holes that are symmetrical with respect to the plane 21.

In the embodiment described by means of FIGS. 1 and 2, the holes I1, I2, E1 and E2 are single. However, it may be planned that there may be a plurality of one (or more) of these holes. This may be done to obtain a minimum airflow in the conduits 23 and 24 so that the flowmeter located in the processing means 9 can work appropriately without the dimensions of the hole considered being excessive to the point where they modify the flow 12 in its vicinity.

It is also possible to envisage a case where the different holes have different dimensions. For example, the surface of the hole I1 may be smaller than that of the hole I2. The pressure PI prevailing within the chamber will then have the form:

$$PI = \frac{a1 \cdot PI1 + a2 \cdot PI2}{2}.$$

a1 and a2 are coefficients depending on the surfaces of the holes I1 and I2. In the example referred to here above, we will have a1<1<a2. In this example or in the inverse example (a1>1>a2), the invention can equally well be implemented.

What is claimed is:

1. A vane designed to be oriented with respect to an axis of an ambient airflow, comprising:

a blade; and means for intake of differential pressure representing an aerodynamic incidence α of the vane, wherein the differential pressure intake means comprises two pressure intake regions positioned in a substantially symmetric way on either side of a leading edge of the blade, and at least one of said two pressure intake regions comprises two holes, each of the two holes positioned at a different distance from said leading edge.

2. The vane according to claim 1, wherein differential pressure is balanced by adapting a dimension of at least one of said two holes.

3. The vane of claim 1, further comprising:

a chamber connecting said two holes.

4. The vane of claim 1, wherein each of said two pressure intake regions comprises two holes.

5. The vane of claim 1, further comprising:

means for measuring total pressure.

6. The vane of claim 1, further comprising:

means for measuring static pressure.

7. A method for orienting a vane with respect to an axis of an ambient airflow comprising:

allowing the vane to be oriented by the ambient airflow;

measuring a differential pressure using two pressure intake regions positioned symmetrically on either side of the leading edge of the vane;

modifying dimensions of one of the two pressure intake regions to cancel out the differential pressure, wherein at least one of said two pressure intake regions comprises two holes, each of the two holes positioned at a different distance from said leading edge.

* * * * *